Figure 1:
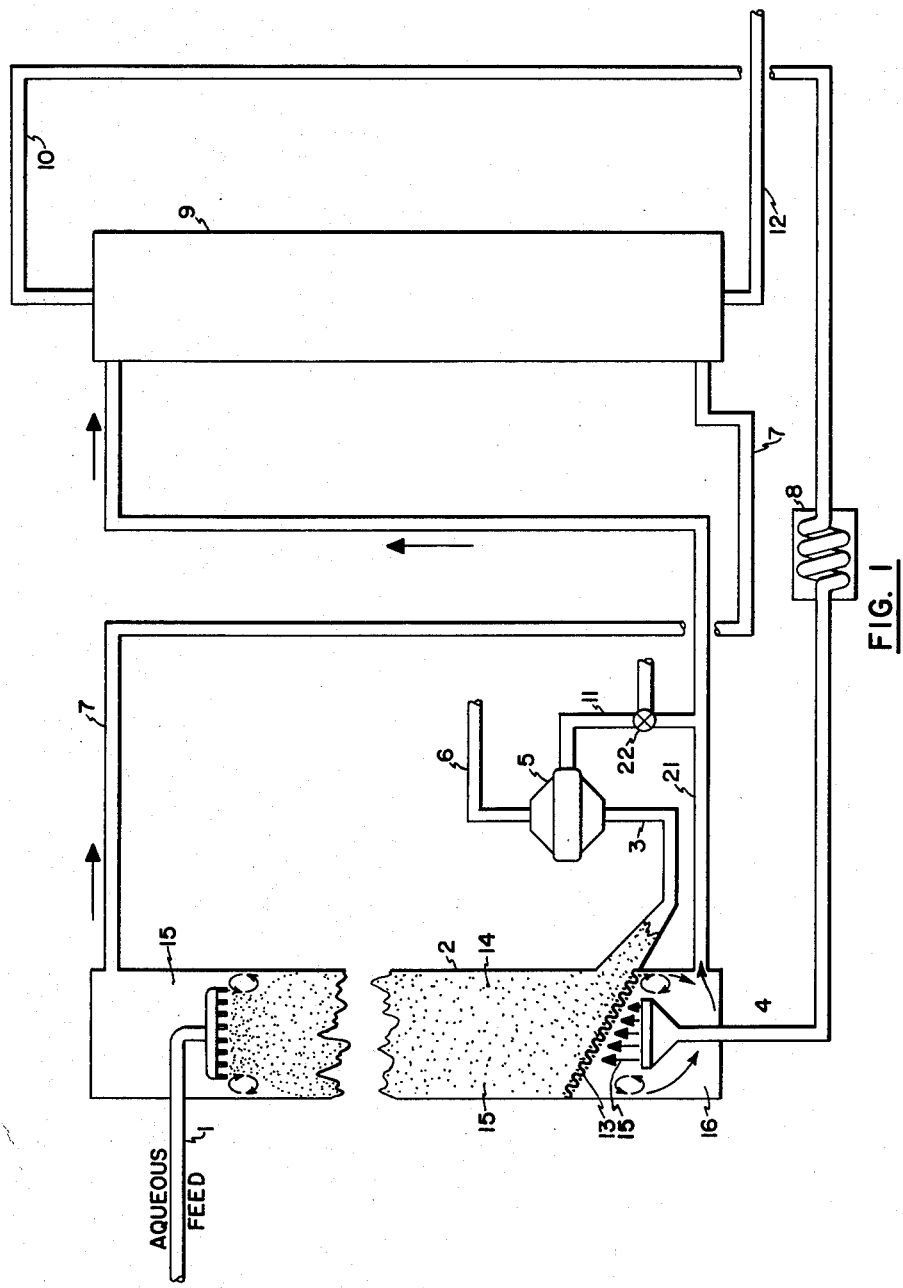
Figure 2:
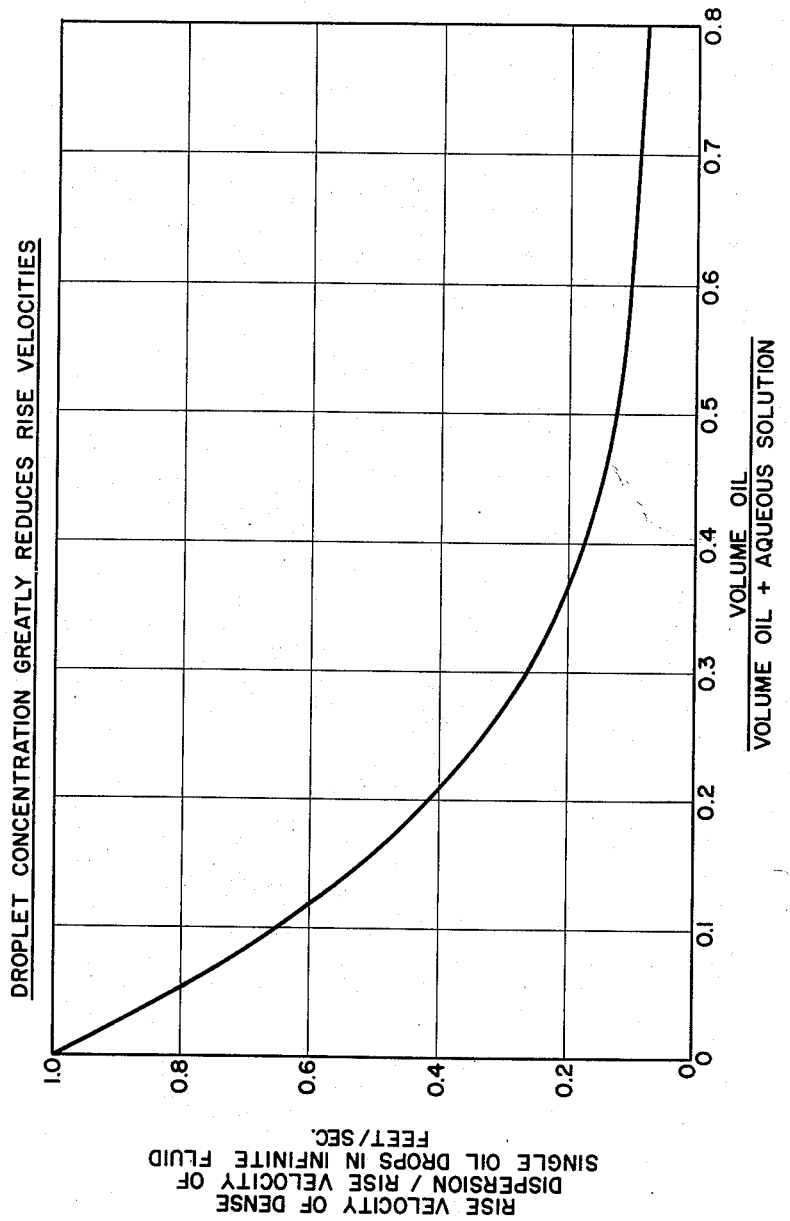

United States Patent Office 3,178,899
Patented Apr. 20, 1965

3,178,899
METHOD OF FREEZE CONCENTRATING SOLUTIONS WITHIN IMMISCIBLE LIQUID PHASE COOLANT
Leonard B. Torobin, Newark, and Donald L. Baeder, Berkeley Heights, N.J., assignors to Esso Research and Engineering Company, a corporation of Delaware
Filed Dec. 29, 1961, Ser. No. 163,214
19 Claims. (Cl. 62—58)

This invention relates to a process of removing the water from aqueous solutions comprising cooling the solution to form ice crystals and separating the crystals.

This invention further relates to a process of separating water from an aqueous solution in which the water is soluble at certain temperatures and insoluble at lower temperatures in which the water is crystallized from its solution by countercurrently contacting it with a liquid immiscible coolant of different density than the aqueous solution containing the water to be separated, wherein the aqueous solution is introduced in the form of a dense dispersion of uniform size droplets and the coolant as a continuous phase. Further, the invention relates to a novel process of obtaining controlled rates of heat transfer between an aqueous solution and an immiscible liquid coolant of different density wherein ice crystals are grown in the aqueous solution, which comprises countercurrently contacting the liquids by introducing the aqueous solution into the top or bottom of the column in the form of a bed of a dense dispersion of uniform size droplets and introducing the coolant liquid into the other end of the column as a continuous phase.

Specifically, this invention relates to a method of concentrating aqueous solutions by removal of all or part of the water present in the form of ice crystals.

Various methods have been used in an attempt to find a practical way of crystallizing water from aqueous solutions. In contacting immiscible coolants with aqueous feeds, frequently an emulsion results which is very difficult to separate. Whenever two-phase mixing or the spraying of one-phase into the other by conventional methods is employed, a wide Gaussian droplet sized distribution normally occurs. The extremely small drops of this distribution will have a very slow rise velocity. Some will be sufficiently small so that they will be permanently dispersed due to Brownian motion. This would result in permanent contamination of the decrystallized product or feed or coolant.

A further disadvantage of the methods previously employed in direct cooling was the difficulty of obtaining uniform, controlled slow chilling rates which are required for proper crystal growth. Although the average chilling rate for proper crystal growth may be 1 to 2° F./minute for certain materials, local chilling rates far in excess of these values may occur due to the relatively small areas available for heat transfer in indirect equipment and the large mixing lengths which characterize direct type equipment. These local chilling rates give rise to the formation of small crystals which exert a disproportionately large adverse effect on the separation.

In indirect heat transfer apparatus, for example, shell and tube heat exchange equipment, an additional disadvantage is the relatively large temperature difference between the cooling surface and the feed being chilled. Reduction of this temperature difference is highly desirable for two reasons. In the first place, crystal growth is improved as the temperature difference is reduced and, secondly, the overall cost of the chilling process is reduced as the temperature difference is minimized, since it reduces the refrigeration requirement and allows a more efficient recovery of refrigeration. For a given rate of heat transfer, the temperature approach can, of course, be reduced by increasing the area for heat transfer. Indirect heat exchangers are generally limited in this respect because of mechanical limitations and the problem becomes particularly acute because restricted internals would readily become blocked with crystal formations.

Previous attempts to separate crystallized materials from their solutions have in many instances been unsuccessful due to the uneven and small crystal size developed in conventional heat exchange or cooling apparatus. Centrifuges did not separate these crystals efficiently due to their slow settling velocities in the mother liquor.

As previously stated, when spraying one immiscible liquid into another, a wide sized distribution of droplets will normally result. The different sized droplets will rise or descend in the coolant at different velocities, some being shocked chilled and others being suspended in the tower or made to flow concurrently with the coolant. This wide size distribution occurs at the higher spray throughput velocities needed to obtain the dense bed and is aggravated by a continuous phase vortex which is formed at the periphery of the spray head and which constitutes a major disturbance across the spray head surface.

Previous attempts to crystallize water from aqueous solutions have utilized indirect heat exchange apparatus wherein the water as it crystallized from solution coated the cold heat exchange surface from which it periodically had to be removed. Other processes using direct cooling have utilized a cooling chamber wherein volatile solvents, such as propane and/or butane, were mixed with the aqueous solution and the entire mixture was cooled by evaporation of the solvent. Both of these processes can cause shock chilling; that is, rapid formation of the ice crystals, which crystals occlude the dissolved solids in the aqueous solution. Further, any system which utilizes autorefrigeration solvents may experience severe turbulence in the vicinity of the growing crystals and prevent the formation of large crystals. Also, the local expansion of the solvent in vaporizing may disintegrate crystals already formed.

The most common commercial process for concentrating or removing water from aqueous solutions is by heating and evaporating the water present. While this procedure has been successful to some extent in effecting dehydrating of aqueous solutions, it has often resulted in undesirable chemical changes in the dissolved solids in the solution which may be sensitive to high temperatures.

An object of this invention is to provide a system with a very large interfacial area for controlled heat transfer between a feed to be treated and a coolant in order to obtain a minimum temperature approach between the coolant and the feed stream being processed. Another object of this invention is to make direct contact, immiscible cooling for concentrating solutions by crystallization feasible by avoiding the need for internals which clog with crystallized material and the need for scrape surface chillers. A further object of this invention is to provide an economical, commercially feasible, continuous crystallization process which requires substantially less initial investment in equipment, little or no maintenance cost, and minimum operating expense. Another object of this invention is to solve the problem of emulsion difficulties which arises in any system using an intimate mixture of immiscible liquids.

It is a further object of this invention to provide an efficient method for removing water in the form of ice crystals from an aqueous solution wherein there is substantially no or a minimum contamination of the ice crystals with the dissolved solids in the solution and where there is a minimum loss of dissolved solids by occlusion in the separated ice crystals. A still further object of this invention is to provide a method of concentration for aqueous solutions by the removal of all or part of the water present. It is a still further object of this invention to provide a process for dehydrating beverages in which water is removed from the beverage in the form of ice crystals and in such a manner that there is very little carry-out of the solution being concentrated with the ice.

These and other objects and advantages will become more apparent in view of the following description of the invention.

Now, in accordance with this invention, an aqueous solution containing a crystallizable water is fed to a treating column which has no internals, at a temperature above the freezing point of the water solution, which enters the top or bottom of the treating column in the form of a dense dispersion. This dense dispersion is produced by a modified spray head described in copending Serial No. 135,092, filed August 1, 1961 and is made up of very closely packed uniform diameter droplets which rise or descend in the column as a bed of spheres, depending on the density of the coolant and at which end of the column it is fed. A continuous liquid coolant phase is fed at the opposite end of the column as the feed, and moves countercurrently to the dense bed of spheres. Because of the uniformity of size of the droplets making up the dense bed of spheres, the droplets move uniformly as a bed in the column and because of the uniformity of the size of the droplets have about the same volume density throughout the column and are chilled at a controlled rate. Within the dense bed the individual droplets exhibit a localized random motion which enhances heat transfer and crystal growth.

The coolant is charged to the column at a temperature below the freezing point of the aqueous solution. By the time the dense bed of droplets reach the opposite end of the column, part or substantially all of the crystallizable water in the droplets is crystallized out as ice. At the opposite end of the tower, the ice crystals and mother liquor form a slurry. This ice crystal and mother liquor slurry is withdrawn from the tower and can be either filtered or centrifuged to separate the crystals from the mother liquor. The warm coolant is withdrawn from the tower at the end opposite to which feed is withdrawn and then cooled to its inlet temperature for reuse.

In order to obtain uniform size droplets from the spray head, an annular baffle at the periphery of the spray head was constructed; i.e., at the outer edge of the orifice plate, which serves to deflect the standing continuous phase vortex away from the orifice holes at the outer edge of the orifice plate. The orifices are made to protrude to discourage the wetting of the spray head surface. In doing this, it was unexpectedly found that the critical throughput for a specific rate, above which non-uniform drops occurred, could be increased by about 80 to 100% with the annular baffle, over that without the annular baffle. It is known that at low throughput rates uniform drops can be obtained; however, at throughput rates required to form the dense bed, non-uniform distribution normally occurs. The modified spray head used to obtain uniform size droplets is more fully described in copending Serial No. 135,092.

In one embodiment of this invention, aqueous solutions are dehydrated to obtain more concentrated solutions by countercurrently contacting the aqueous solution with a cold immiscible coolant. In this application, the aqueous solution is sprayed into the treating column in the form of a dense dispersion of uniform size droplets which are countercurrently contacted with an immiscible coolant continuous phase. The coolant is charged to the tower as the continuous phase at a temperature below the freezing point of the water solution and crystallizes a portion of the water present in the solution which is removed as a slurry of ice crystals and mother liquor from the bottom of the column. The ice crystals can be separated from the more concentrated aqueous solution or mother liquor by using a basket centrifuge, by filtration, or other conventional means.

This embodiment has specific applications to temperature sensitive solutions, for example, beverages, wherein the flavor or the vitamins present may be altered or detrimentally affected by heat, if heat were used to concentrate the solutions by evaporation. This process can be advantageously used to preserve in the concentrated solution volatile constituents which would normally be entrained or vaporized and removed during concentration at low temperatures employing vacuum evaporation or in crystallizing by vaporizing a direct contact refrigerant. Also, economic concentration of aqueous industrial waste streams can be carried out in accordance with the process and the concentrated waste materials more easily disposed of.

These, and other objects and advantages will become apparent from the following description taken in connection with the drawings, wherein FIG. I is a diagrammatic, elevational view of an immiscible cooling crystallizing apparatus containing two heat transfer towers; namely, a tower for crystallizing the crystallizable water in the feed and a second tower for heat exchange between the warm coolant and the cold, treated, mother liquor or concentrate from which the crystallized water has been separated. This diagram also shows a means of external heat exchange to provide makeup refrigeration for the immiscible coolant, and a separation apparatus for separating the crystallized material from the solute.

FIG. II is a graphic representation showing the effect of droplet concentration on the ratio of rise velocity of the dense dispersion to the rise velocity of a single drop in an infinite fluid.

The aqueous solution from which water is to be crystallized must remain liquid under the conditions of spraying. For example, the crystallizable water should be completely dissolved in the feed prior to spraying and, after crystallization, the mother liquor or concentrate should remain in a fluid, easily handled state for ease in separating the crystallized material from the mother liquor. Further, in order to prevent the formation of an emulsion or entrainment in the coolant of the aqueous solution, there must be sufficient density difference between the coolant and the aqueous solution so that they naturally separate by gravity. This difference should exist even after the crystallized water is separated from the mother liquor. Any aqueous solutions containing dissolved water, which will crystallize on cooling, is a suitable feed.

A suitable feed for this process is fresh orange juice. A typical fresh orange juice composition would contain 0.005% oil and a sugar to acid ration of about 13/1. In accordance with this invention, the volume of fresh orange juice can be reduced by as much as 70 to 80% by the removal of crystallizable water. The concentration of the orange juice slurry that results can be frozen and shipped as such, or possibly could be dried by evaporation at ambient temperatures to form a completely dry concentrate.

In concentrating orange juice, for example, it is important from the point of economy to minimize the amount of dissolved orange juice solids which are occluded in the removed ice crystals. However, the primary consideration here is in the preservation of the flavor of the product, and loss of minor amounts of occluded solids is relatively unimportant. An additional feature of primary importance is the growing of large uniform size ice crystals which can be readily separated by filtration or centrifugation or other conventional separating processes.

Another feed to the described process, for purposes of concentrating the feed for ease in shipment and economies in packing, would be alcoholic beverages, such as beer, ale or wine. A considerable amount of interest has recently been expressed in an efficient, economic means for concentrating beer in such a manner that the flavor and quality of the beer is not affected, for subsequent shipment and reconstitution at outlying distribution points. Beer containing about 3.6 wt. percent alcohol, for example, can be concentrated in accordance with the above described process to remove 60–80% by volume of the water present in the form of ice crystals, which increases the concentration of alcohol to about 12.5 wt. percent.

Here again the chemical composition of beer which contributes to its distinct flavor and acceptability is extremely temperature sensitive and the cold concentration process described would result in removal of water and concentration of the beer without a detrimental effect on the beer flavor or loss of volatile constituents.

In another specific embodiment of this invention, an industrial waste stream is concentrated to facilitate disposal and obviate normal pollution problems. For example, waste sulfite liquors are discharged from pulp mills in large quantities and contain from 10–15% dissolved solids causing objectionable contamination of rivers and streams. The sulfite waste liquor could suitably be cooled and concentrated in accordance with the above described invention to a point approaching obtaining completely dry solids. The minor amount of occluded solids present in the separated ice crystals would not normally constitute a pollution problem and the melted ice crystals could be disposed of directly in rivers or streams, or the purified water could be reused in the process. The 15–20% by volume of the resulting concentrated slurry could easily be disposed of or be dried by evaporation and the dried solids disposed of in a conventional manner. This process also provides an efficient, economic method of recovering small amounts of dissolved solids in industrial process streams, and for the recovery of minerals from fresh and saline water.

The coolant should be immiscible or at most only partially miscible with the aqueous solution. Where it is undesirable to have the coolant contaminate the decrystalized feed, the coolant should be substantially immiscible with the feed. The only other requirements for the coolant are that it be of a different density than the feed and that it be liquid at the temperature to which the feed is to be cooled.

The suitable coolants for crystallizing water from an aqueous solution are oil fractions, pure chemicals, liquid metals, and the like. However, certain coolants may be selected to simultaneously effect chemical reactions or extractions. In concentrating beverages, suitable coolants are oil fractions, edible vegetable oils, cottonseed oil, normally gaseous liquid hydrocarbons, halogenated hydrocarbons, Freons, etc. For example, $C_5/C_7$ hydrocarbon fraction propane, butane, and fluorinated hydrocarbons and mixtures thereof.

The coolant can be either less dense or more dense than a specific aqueous solution being treated. If a coolant is more dense than the feed used, it will be fed to a treating column through the top of the column and the feed to be treated in the bottom of the column in a manner described in copending Serial No. 135,092. On the other hand, if the coolant to be used is less dense than the feed being treated, the coolant will be fed to the treating column in the bottom of the column and the feed will be fed to the top of the column in the manner more specifically described in the present application.

Various diluents may be added to the coolant, which is to be used to crystallize the feed, in order to improve the viscosity of the coolant (i.e. increase as well as decrease it) so that it may be more easily handled and/or to aid in the crystallization and separation of the crystals from the feed. Solvents for the coolant may be added, as well as antisolvents for the water being crystallized. Depending on the feed being treated, solvents for the coolant, such as aromatic hydrocarbons, aliphatic hydrocarbons, and the like may be used.

By carefully controlling the droplet size diameter in the range of $3/8$ to $1/24$ inch, preferably in the range of $1/4$ to $1/20$ inch, though diameters of the size of $1/2$ to $1/32$ inch, may be used, the volume density of the dense dispersion of droplets is controlled, thereby controlling the velocity of movement and rate of cooling of the feed.

For the sake of simplicity, the aqueous feed will hereinafter be referred to as descending in the column and the coolant as rising. It is important that uniform spherical shaped droplets of narrow size distribution be obtained. If non-uniform diameter droplets are formed, as usually occurs in conventional spray columns, the individual droplets will rise at different rates and controlled chilling of the feed cannot be obtained. This will result in a wide particle size distribution in the crystals formed and the smallest particles will either cause blinding in the filter medium or will not centrifuge at reasonable throughputs and gravitational fields. Also, an undue amount of contamination of the crystals with mother liquor can occur.

The dense dispersion of uniform diameter droplets provides maximum surface for heat transfer and results in maximum efficiency of heat transfer from the aqueous solution droplets to the coolant and subsequently from the warmed coolant to the cold decrystallized mother liquor. By controlling the rate that a feed is fed to the treating tower, the droplet diameters and the rate of descent of the dense dispersion of the bed of spheres, it is possible to prevent shock chilling below the crystallization temperature and to form crystals which are substantially pure and which can be subsequently easily separated from the mother liquor. Because of this efficient means of heat transfer, the temperature difference between the two phases at any point in the column is minimized and therefore the growth of large pure crystals is enhanced. All of these advantages have been obtained without the droplets in the dense dispersion forming agglomerates. Although the droplets are closely packed, they do not agglomerate as long as there is movement of the continuous coolant phase through the liquid bed of droplets.

The aqueous solution to be crystallized can be charged to the treating tower at a rate of 15 to 325 ft.$^3$ per ft.$^2$ of column cross section per hour though rates of 35 to 150 ft.$^3$/ft.$^2$/hr. are preferred; however, rates of 25 to 250 ft.$^3$/ft.$^2$/hr. can also be used. The rate at which the aqueous solution is charged to the treating tower will depend on the feed temperature, the final crystallization temperature and the height of the column. The rate at which the aqueous solution is charged to the treating tower and countercurrently contacted with the immiscible coolant is sufficient to provide the desired dense dispersion of droplets which descend in the column at the desired velocity to provide the necessary rate of heat transfer, obtain proper chilling and crystallization in the droplets.

The difference in density between the two immiscible liquids being contacted is sufficient to separate the liquids by gravitational force under the conditions which the process is carried out. The rate of descent of the feed in the column is a function of the volume density of the dense dispersion and the feed rate. All of these variables have a direct effect on the cooling rate of the material being treated which is, of course, critical. Cooling rates of .25 to 15° F. per minute can be used, more preferably rates of $1/2$ to 7° F. per minute are used, but depending on the materials being treated, the chilling rate can be 1–3° F. per minute. One of the most important variables affecting the rate of ascent or descent of the material being treated in the treating column is the droplet holdup or, otherwise stated, the volume density of the droplets as compared to the total volume of the droplets and immiscible coolant phase. Another is the droplet diameter, which has been previously discussed.

The volume holdup can be .35 to .80 ft.$^3$ feed/ft.$^3$ column, preferably a holdup of .55 to .75 ft.$^3$ feed/ft.$^3$ column is used. The residence time of the droplet in the tower is selected to obtain the desired chill rate and the chilling range. The rate and temperature at which the immiscible coolant is fed to the treating tower and contacted countercurrently with the dense dispersion of uniform diameter droplets affects the amount of cooling of the feed solution that is obtained. Throughput rates of coolant are comparable to the throughput rates of feed solution and will vary slightly with their relative specific heats and their respective densities.

The input temperature of the coolant to the treating tower is sufficient to chill the droplets to the separation temperature and to crystallize or precipitate the desired amount of crystallizable water from the aqueous feed solution. The inlet temperature of the coolant will be 1 to 10° below the outlet temperature of the feed and at least 1 to 10° below the minimum crystallization temperature of the crystallizable material.

The inlet temperature of the aqueous solution being treated can be advantageously just above the temperature at which ice begins to crystallize at the concentration of dissolved solids present in the aqueous solution being treated. Solutions to be treated can be received at substantially higher temperatures and rapidly cooled to a temperature just above the crystallization temperature of the solution efficiently and economically by using a tower as described in this invention as a heat exchange tower, only. Alternatively, the rapid chilling to a temperature just above the crystals temperature can be accomplished in any conventional heat exchange apparatus. In this manner, the entire capacity of a particular heat exchange tower can be used to grow crystals with a minimum amount of the capacity being used to reduce the feed to its initial crystallization temperature. However, the crystallization tower can obviously be used to both reduce a solution to its crystallization temperature and to crystallize water out of solution.

The crystallization temperature for any specific feed will depend upon the amount of dissolved solids present. Suitable initial inlet temperatures for an aqueous feed can be 10 to 200° F. More common inlet temperatures will be in the range of 25 to 70° F. The inlet temperature of the coolant will be determined by the acceptable chilling rate for a specific feed, the amount of solids removed with ice crystals that can be allowed and the amount of water it is desired to remove as ice crystals. Suitable inlet temperatures of coolant will be 30° to −100° F. More commonly, in removing ice from aqueous solutions by crystallization, temperatures will be in the range of 20° to −30° F. Carrying out the process in this manner can effectively remove from 5 to 85% by volume of the crystallizable water present in the solution with a minimum loss of dissolved solids to obtain the desired concentration of the solution treated.

A specific feature of the described cooling process is that the rate of growing the ice crystals can be controlled in such a manner that there is sufficient time allowed for the ice crystal to reject impurities as they are grown, and the countercurrent contact of the crystal matrix that accumulates in the bottom region of the tower with the coolant advantageously affects the removal of any occluded dissolved solids from the surface of the crystals.

The separation process can be advantageously carried out at approximately atmospheric pressure. However, this may change depending on whether or not a solvent is used to aid in reducing the viscosity of the coolant or in the crystallization of the solution being treated. Since it is desirable to maintain all of the reactants in the liquid phase when volatile solvents are used, sufficient pressure is employed to maintain these solvents in the liquid phase.

A uniform crystal growth has been obtained from various aqueous feeds by carefully controlling the rate of cooling with resulting crystals of size 25 to 1000 microns depending on the feeds and the conditions of crystallization. However, crystals of size 50 to 400 microns are more common. A uniform crystal growth under the controlled conditions of the inventive process has facilitated the separation of crystallizable water from its solutions with minimum loss of dissolved solids. These separations have heretofore not been either efficient or economically feasible by direct immiscible coolant techniques known in the art.

The equipment used to carry out the invention is relatively simple and comprises two or more heat exchange towers without internal baffling, means for transferring the feed and coolant between the towers and a means for adding makeup refrigeration. As previously stated, an appropriate separation means is used for separating the crystallized material from the mother liquor; for example, a filter, basket centrifuge, or suitable screw pump extrusion device, etc.

In removing water from an aqueous solution to form a concentrate, a single large tower or a bundle of smaller diameter units operating in parallel or series can be used. The second tower for heat exchanging the warm coolant with the cold mother liquor would be of similar dimensions, or a suitable grouping of smaller diameter columns arranged in bundles. The height and diameter of apparatus for a specific process can be varied to accommodate the required cooling and throughput for a specific feed. The cooling towers when operated in series can have the inlet temperatures of the feed and coolant reduced in successive towers.

The spray head used for introducing the uniform diameter droplets is important in this invention is that it allows greater throughput without upsetting the column. This spray head also produces the uniform diameter droplets which pack and rise as a bed, each droplet rising at about the same velocity as the next droplet, providing a column of densely packed droplets of about equal volume density throughout the tower. Generating the droplets in this manner provides the same environment and cooling history for each droplet in the densely packed beds, resulting in obtaining large ice crystals. The invention however is not to be limited to this manner of forming the uniform diameter droplets, since any means by which the uniform droplets are formed can be used in accordance with this invention and are intended to be encompassed.

In accordance with one embodiment of the invention, wherein it is desirable to obtain a preliminary separation of the ice crystals from the mother liquor concentrate, a slanting grid or drainboard or screening means, is provided in the bottom of the contacting tower (where the feed to be treated is fed to the top of the tower) which diverts the ice crystals and removes them from the side of the tower. The screening means can be either above or below the coolant inlet means. The major portion of the concentrated solution continues down in the tower around the coolant sprayhead and is removed from the bottom of the tower as the primary mother liquor. By having the screening means above the coolant inlet, the coolant liquid washes the ice matrix accumulated on the screen and replaces some of the occluded mother liquor located in the interstices of the ice matrix with coolant liquid. A minor portion of the concentrate continues with the diverted ice crystals and is separated from the ice crystals in a conventional separation apparatus, this concentrate or mother liquor is referred to as the secondary mother liquor. This particular feature of the invention is not essential in carrying out the crystallization step described and merely forms a specific embodiment of the invention. Providing preliminary separation of the ice crystals from mother liquor reduces the amount of separation capacity required to remove the ice crystals from the mother liquor.

The treating tower can either have the solution to be treated fed into the top and the coolant fed into the bottom or, conversely, the coolant fed into the top and the solution to be treated fed into the bottom. Whichever configuration is adopted, the solution to be treated is the one that is fed in the form of a dense dispersion of uniform diameter droplets.

In one embodiment of the invention, one or more towers may be used primarily to form crystals of the water to be separated, and additional units may be used to wash the crystals to remove the remaining amount of any occluded dissolved solids present. Such units can incorporate washing the crystals with mother liquor, coolant, or with a small amount of relatively warm pure water product.

The novel features of this invention may perhaps be better understood by referring to the accompanying drawings.

FIGURE I of the drawings describes an embodiment of the immiscible coolant crystallization and separation process. An aqueous solution containing crystallizable water is fed to treating column 2 through line 1 at a temperature sufficiently high to render all of the crystallizable water in the feed in solution and to render the feed sufficiently fluid that it may be conveniently handled. The feed is introduced in the column in the form of a dense dispersion of uniform diameter droplets 14 of a size such that there is a maximum area for heat exchange between the sprayed droplets and the immiscible coolant liquid 15 consistent with the optimum desired descent velocity. The aqueous solution, from which the water is to be crystallized, is fed at a rate which attains the desired volume density of sprayed droplets in the continuous phase. The feed rate is dependent upon, to a certain extent, the density difference between the aqueous solution and the coolant, as well as upon the rate at which the coolant 15 is charged to column 2. The volume density of the droplets in the continuous phase; i.e. the holdup, is sufficient to obtain the desired rate of descent in the column and, accordingly, the desired cooling rate. The dense dispersion of sprayed droplets descend in column 2 countercurrently to an ascending continuous phase of coolant at a rate regulated in such manner that there is sufficient heat transfer from it to the coolant to crystallize out of solution the required amount of crystallizable water present in the feed. The immiscible coolant 15 is introduced through line 4 at a temperature selected to crystallize from the feed all or part of the crystallizable water present in the feed.

The coolant is fed at such a rate that will not upset the countercurrent flow of the sprayed aqueous droplets. By controlling the rate of feed and coolant to column 2, the rate of descent of the sprayed droplets in the tower is regulated so that there is sufficient heat transferred from the coolant to the feed in the column to crystallize the water present in the feed. By carefully controlling the droplet size and its holdup in the heat exchange column, and the temperature of the coolant and rate of the feed of the coolant, the rate of cooling of the droplet is controlled so that large easily separated ice crystals of water are grown. Controlled crystal growth allows time for the ice crystals to reject dissolved solids as the crystal increases in size. This results in obtaining relatively to substantially solids free crystals.

Also, the countercurrent flow of the coolant effectively aids in washing away occluded solids from the surface of the ice crystals which have collected in the bottom region of the tower. In order to maintain effective countercurrency in the column, the difference in density of the two materials to be countercurrently contacted is such that they easily separate by gravitational force under the desired operating conditions so that the liquid fed into the bottom of the column is withdrawn at the top and liquid fed to the top of the column is withdrawn from the bottom.

The sprayed dense dispersion of droplets are allowed to stay in contact with the coolant for a sufficient time to form large, easily separated ice crystals that are relatively free of dissolved solids, and to crystallize all or part of the crystallizable water present.

The crystallized water and the mother liquor form a slurry which is removed from the bottom of the column 2. A preliminary separation can be accomplished by collecting the ice crystals on a wire grid 13 and allowing most of the mother liquor (primary) to continue downward. Alternatively, the entire slurry can be removed and separated in a conventional manner. The ice crystal slurry is fed through line 3 to an appropriate separation apparatus 5.

The pressure under which the countercurrent contact takes place is such that all of the materials remain in the liquid phase. Separation means 5 removes the crystallized material from the remaining chilled secondary mother liquor, which liquid is taken through line 11 via valve 22 and added to primary mother liquor in line 21 and fed to another heat exchange column 9 wherein the chilled decrystallized mother liquor is countercurrently contacted with the warm coolant removed from the top of column 2 via line 7 and fed to column 9. The warm coolant and cold mother liquor are countercurrently contacted in column 9 in a similar manner as the dense dispersion technique as used in column 2 in order to recover refrigeration.

Since the temperature approaches in each of the columns can be within 1 to 10° F., an extremely efficient heat transfer is obtained. The chilled coolant is removed from the top of column 9 through line 10 and contacted with a conventional external heat exchange means 8 wherein makeup refrigeration is added to reduce the temperature of the coolant to the desired inlet temperature. Heat exchange means 8 provides the makeup refrigeration loss due to the heat of crystallization of the material being crystallized and refrigeration loss to the walls of the heat exchange towers and associated apparatus. Alternatively the coolant can contain a volatile refrigerant and makeup refrigeration can be provided by allowing some of this to vaporize external to the tower, thus cooling the coolant. The mother liquor or concentrated solution, free of 5 to 95% of crystallizable water, and after heat exchange with the coolant, is withdrawn from tower 9 through line 12.

It is to be understood that more than one treating tower and one heat exchange tower may be used in series or in parallel and that all or part of the crystallizable water present in an aqueous solution can be removed in one or more of treating towers. Where the towers are used in series, they can be operated at successively lower temperatures.

In another embodiment of this invention, beverages such as orange juice, lemon juice, grapefruit juice, vegetable juice, milk, etc. are concentrated by the removal of about 70 to 85% of the water present in the beverages. The cold crystallization process is advantageous because it does not detrimentally affect the flavor and vitamin content of the juices treated and there is substantial economies effected in concentrating by freezing over that of concentrating by evaporation of water present. In the concentration of the juices by the removal of ice, a suitable initial cooling temperature of about 25 to 68° F. with a final cooling temperature of about 0° to −5° F. is utilized; that is, the beverage being treated is introduced into the cooling tower in the form of a dense dispersion at a temperature of about 25 to 68° F. with an outlet temperature of about 0 to +30° F. The coolant is conversely introduced at a temperature of about —5 to +25° F. and leaves the tower at a temperature of about 20 to 65° F.

Other uses of the above described process can be in the recovery of dissolved solids from aqueous streams by removing substantially all of the crystallizable water in accordance with this invention. The liquid concentrate can be recovered or, in some cases, a dried product can be obtained by removing the minor amount of water remaining by conventional evaporation processes. This process may be further used to purify dissolved solids by repeated crystallization of the solids from water.

This process has other obvious utilities in the pharmaceutical chemical food industries for dehydrating sugar solutions, heat sensitive chemicals, medicines, vitamins, antibiotics, whole blood, and pharmaceutical compounds.

This invention is further exemplified by the various runs reported in the following examples.

*Example 1*

In an example of this invention, fresh orange juice containing about 0.005% oil and a sugar to acid ratio of about 13 to 1 is countercurrently contacted with a light edible oil coolant. The orange juice is introduced as a dense dispersion of uniform diameter droplets and is contacted with the continuous coolant phase. The orange juice is fed to a first tower at a temperature of about 68° F., and is rapidly cooled to a temperature of about 30° F. in the tower which is used solely as a heat exchange means. The orange juice is then fed into the top of the second tower at a temperature of about 30° F. in which it is countercurrently contacted in a similar manner with the coolant fed into the bottom of the tower at a temperature of about 10 to 20° F. The ice crystals intially from within the orange juice droplets in the top of the tower and grow as they descend countercurrently to the ascending continuous phase of coolant. The orange juice droplets are cooled at a rate of 1 to 4 degrees per minute, facilitating the formation of large ice crystals and concentrating the orange juice with a minimum loss of dissolved solids to the ice crystals. Cooling of the orange juice droplets and the growing of the crystals is controlled so that the crystals have sufficient time as they grow to reject otherwise occluded dissolved solids. The water crystals are removed from the bottom of the column with the concentrated orange juice solution and are found to have a size between 200 and 500 microns. Very few small crystals are present. The crystals and concentrated orange juice solution is fed to a basket centrifuge wherein the crystals are separated. About 50% by volume of the orange juice feed is removed as relatively pure ice crystals.

The cold orange juice concentrate is then countercurrently contacted in a second crystallization tower at a lower temperature to remove 50% by volume of the remaining concentrate as ice crystals. The final concentrate is about one-fourth the original volume and is canned and frozen for shipment.

*Example 2*

Fresh whole milk having a freezing temperature of about 25 to 30° F. is sprayed into a treating column as described in FIG. 1 of the drawings, in the form of a dense dispersion of uniform diameter milk droplets of about 1/8 to 3/8 inch diameter. The droplet diameter is generally about twice the diameter of the orifice through which it has been sprayed. The inlet temperature of the feed is about 28° to 32° F. The spray area is protected from the continuous phase coolant vortex by means of an annular baffle having a vertical height of about 1 to 4 inches. The spray head is 3 to 6 inches in diameter. The feed is introduced through the orifices at .1 to .3 ft./sec. The immiscible coolant comprises a pure middle distillate hydrocarbon which is fed to the bottom of the tower at a temperature of about —5° F. to 20° F.

The sprayed aqueous droplets form a dense dispersion and descend in a dense bed of uniform size spheres countercurrently to the ascending coolant phase. The droplet holdup or volume density of the milk droplets is about 65 to 75% of the tower volume. This provides a chilling rate of about 1 to 3° F./min. A portion of the water present in the milk crystallizes within the sprayed droplets and form ice crystals. The concentrated milk solution is withdrawn at a temperature of about 10° to 25° F. The continuous immiscible cooling phase is withdrawn from the top of the tower at a temperature of about 30° F.

The ice crystal slurry can be washed with coolant or with a small amount of pure water to remove occluded milk solids. The washed crystals can be separated from the coolant or any remaining concentrate by conventional means. In accordance with this process, the milk feed can be reduced in volume by about 75%. The remaining water can removed from the concentrate by evaporation at ambient temperature in order to obtain a dried power milk. Further, most of the refrigeration spent on cooling the mother liquor and forming the ice is recovered by separately contacting the warm coolant with the separated ice crystals and the cold concentrate.

*Example 3*

In a similar manner, beer is concentrated by the removal of water as ice crystals. Because of the alcoholic content of beer, the inlet temperature of about 25 to 30° F. is suitably used with a final temperature of —10 to 15° F. The coolant is introduced at a temperature of —15 to +20° F. and is withdrawn at a temperature intermediate the inlet temperature of the coolant and the crystallization of beer of about 15 to 25° F. In this manner, 65 to 75% by volume of the beer feed is removed as crystallized ice. The concentrate on reconstitution with water and addition of carbonation is found to have an acceptable taste and flavor and not to have been detrimentally affected by the crystallization process.

*Example 4*

In treating industrial waste streams which comprise dissolved solids to concentrate them prior to disposal, the waste stream is normally at the temperature at which it is removed from a particular process. In concentrating waste sulfite liquors from a sulfite process of manufacturing paper which contain 10 to 15% by weight of dissolved solids, the liquors are normally obtained at a temperature of about 220° F. The sulfite waste liquor is rapidly cooled by this dense dispersion technique as previously described from a temperature of about 220° F. to a temperature just above its freezing point of about 20 to 30° F. No ice crystals are formed in this step and the apparatus is used solely as an efficient heat exchange means. The sulfite liquor is now cooled to about 20 to 30° F. and fed to a second tower in accordance with the previously described examples in which 50 to 80% by volume of the water present is removed. The removed water in the form of ice crystals is relatively pure and can be disposed of in rivers or streams in a conventional manner. The concentrated mother liquor separated from the ice crystals can be further dried by evaporation and shipped and/or otherwise disposed of.

The application of this invention to feeds containing various dissolved solid materials and to colloidal suspensions with various immiscible coolants and with various solvents is readily apparent to one skilled in the art from the above description. The critical feature of this invention is in growing crystals in dense dispersions of uniform size droplets which do not agglomerate or stick together and move at a controlled rate and which are chilled by countercurrently contacting with a continuous phase of coolant in such a manner that an efficient heat exchange between the droplets and coolant and uniform crystal growth of the crystallizable material within the droplets are obtained.

This application is a continuation-in-part of Serial No. 135,092, filed August 1, 1961.

This invention is not to be limited by any theory of operation but only by the appended claims.

What is claimed is:

1. A process for concentrating an aqueous solution by direct countercurrent contact with an immiscible liquid coolant having a density different from that of the said aqueous solution comprising the steps of continuously introducing a stream of said coolant at one end of the vertical treating zone and continuously withdrawing coolant in the liquid phase at the other end of said treating zone, thereby maintaining a continuous phase of the said immiscible coolant in a vertical treating zone, said coolant being introduced at a temperature below the freezing point of the water within the said solution, continuously introducing substantially uniform droplets of the said aqueous solution at the end of the treating zone from which the said coolant is withdrawn and continuously withdrawing ice crystals and concentrated solution from the treating zone from the end of the column which the coolant is introduced.

2. The process of claim 1 where the aqueous solution to be treated is fed to the treating tower at a rate of 15 to 325 ft.$^3$ per ft.$^2$ of column cross section per hour.

3. The process of claim 1 where the volume holdup is 0.35 to 0.80 ft.$^3$ of feed per ft.$^3$ of column 4. The process of claim 1 where the droplet size diameter is in the range of $\frac{3}{8}$ to $\frac{1}{24}$ inch.

5. The process of claim 1 where a preliminary separation of ice crystals is accomplished by collecting said ice crystals on a wire grid and allowing most of the concentrated solution to continue downward.

6. The process of claim 1 wherein 5 to 90% of the crystallizable water present is removed as ice crystals.

7. The process of claim 1 wherein the aqueous solution comprises whole milk.

8. The process of claim 1 wherein the aqueous solution comprises industrial waste streams.

9. The process of claim 8 wherein the industrial waste stream comprises sulfite waste liquors.

10. A process for concentrating an aqueous feed solution by removing water from said solution comprising countercurrently contacting said aqueous solution with an immiscible coolant of different density than said aqueous solution, said coolant being introduced at a temperature below the freezing point of the aqueous feed solution, the feed being introduced at a temperature above its freezing point into a tower by spraying said feed into the tower in the form of a dense dispersion of substantially uniform diameter droplets which move as a bed of spheres countercurrently to the coolant in the tower providing maximum interfacial area of contact and efficient heat transfer between the coolant and the droplets, said contact being carried out in the liquid phase, wherein ice crystals are grown at a controlled rate within each of the spray droplets, removing said ice crystals and cold concentrated aqueous solution from the opposite end of the tower from which the feed was introduced, and removing relatively warm coolant in the liquid phase from the tower from the opposite end from which it was introduced.

11. The process of claim 10 wherein the volume holdup of the dispersed phase feed droplets is 0.35 to 0.80 of the total volume of the tower.

12. The process of claim 10 wherein the dispersed phase feed droplets are chilled at a rate of $\frac{1}{4}$ to 15° F./minute.

13. The process of claim 10 wherein the temperature difference between the continuous phase coolant and the dispersed feed phase is up to 1 to 10° F.

14. The process of claim 10 wherein the inlet temperature of the feed is 10 to 200° F. and the inlet temperature of the coolant is below the crystallization temperature of the water in the aqueous solution feed and is 30 to —100° F.

15. A method for concentrating an aqueous feed solution by removing water from said solution comprising countercurrently contacting said aqueous solution with a continuous phase immiscible coolant, said coolant being introduced in the liquid phase at a temperature below the freezing point of the aqueous feed solution and at a temperature of 20 to —30° F., the feed being introduced at a temperature above its freezing point into a tower by spraying said feed into the tower in the form of a dense dispersion made up of essentially uniform diameter droplets at a temperature of 25 to 70° F., said droplets moving as a bed of spheres countercurrently to the continuous phase coolant providing maximum interfacial area for contact and efficient heat exchange between the coolant and the droplets, said feed being introduced at a sufficient rate to provide a droplet volume holdup of 0.35 to 0.80 of the total effective volume of the column wherein ice crystals are grown at a controlled rate within each of the sprayed droplets, said ice crystals and the uncrystallized feed being removed through the opposite end of the tower from which they were introduced and relatively warm continuous phase coolant being removed in the liquid phase at the opposite end of the tower from which it was introduced.

16. The process of claim 15 wherein the temperature difference between the continuous phase and the dispersed phase feed is 1 to 10° F.

17. The process of claim 15 wherein the dispersed phase feed droplets are chilled in the tower at a rate of 0.25 to 15° F./minute.

18. A method of concentrating beer by removing water from the beer comprising countercurrently contacting said beer with an immiscible hydrocarbon coolant, said coolant being introduced at a temperature below the freezing point of the beer as a continuous phase, and the beer being introduced at a temperature above its freezing point wherein the beer is introduced in a cooling tower in the form of a dense dispersion made up of essentially uniform diameter droplets which descend as a moving bed of spheres providing maximum contact surface between the beer droplets and the immiscible coolant and efficient heat transfer between the two, crystallizing a portion of the water present, withdrawing coolant in the liquid phase from the top of the tower removing a slurry of concentrated beer and water as ice crystals from the bottom of said cooling tower and separating the ice crystals from the concentrated beer.

19. A process of concentrating an aqueous orange juice solution by removing water as ice crystals from said orange juice solution having a freezing point between 25 and 28° F. containing about .005 wt. percent of oils and a sugar to acid ratio of about 13/1, comprising countercurrently contacting said feed at a temperature above its freezing point, with an immiscible liquid coolant at a temperature below the freezing point of the feed, said coolant comprising a suitably treated edible oil having a freezing point below —20° F., by spraying the orange juice into the top of a heat exchange tower in a form of a dense dispersion made up of uniform droplets of about $\frac{1}{8}$ to $\frac{3}{8}$ inch diameter which droplets descend as a moving bed of spheres which are cooled at a rate of about 1 to 3° F./min., withdrawing coolant in the liquid phase from the top of the tower removing the ice crystals and concentrated orange juice from the bottom of the tower and subsequently separating the resulting ice crystals and concentrated orange juice solution.

(References on following page)

References Cited by the Examiner

UNITED STATES PATENTS

| | | | |
|---|---|---|---|
| 2,666,304 | 1/54 | Ahrel | 62—58 |
| 2,764,488 | 9/56 | Slattery. | |
| 2,886,603 | 5/59 | Shelton | 62—124 X |
| 2,945,903 | 7/60 | Findlay. | |
| 2,997,856 | 8/61 | Pike. | |
| 3,098,733 | 7/63 | Rosenstein | 62—58 |
| 3,098,735 | 7/63 | Clark | 62—58 |
| 3,137,554 | 6/64 | Gilliland | 62—58 |

FOREIGN PATENTS

| | | |
|---|---|---|
| 70,507 | 6/46 | Norway. |
| 102,539 | 9/41 | Sweden. |
| 806,727 | 12/58 | Great Britain. |
| 985,905 | 7/51 | France. |

NORMAN YUDKOFF, *Primary Examiner.*

ROBERT O'LEARY, GEORGE D. MITCHELL,
*Examiners.*